April 14, 1931.  R. S. SANFORD  1,800,473
BRAKE OPERATING MECHANISM
Filed Feb. 28, 1927
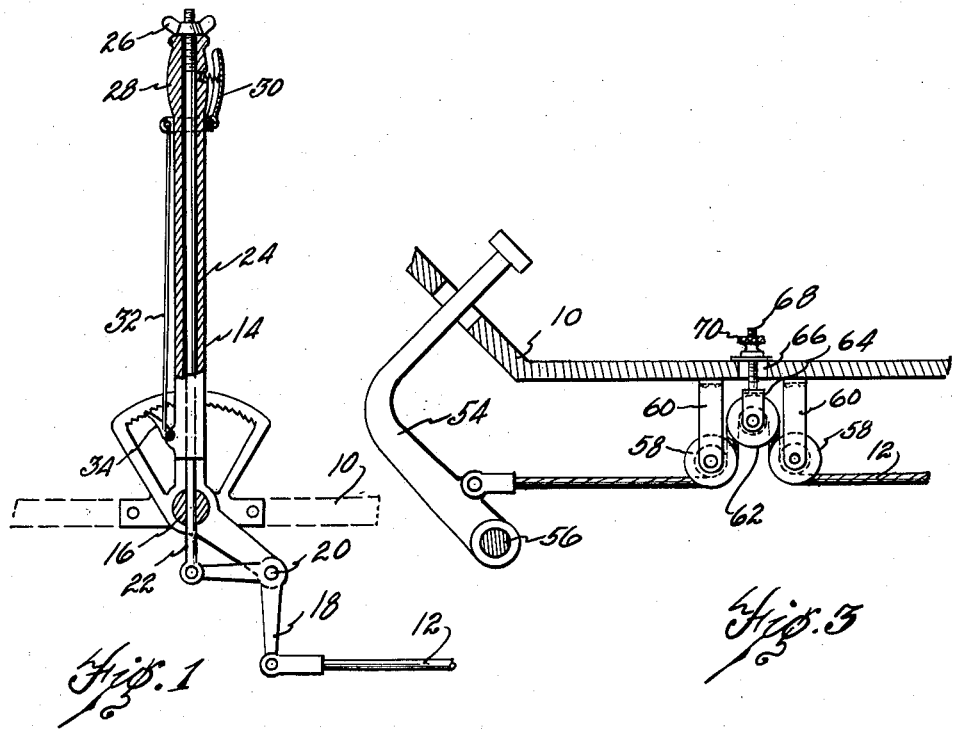
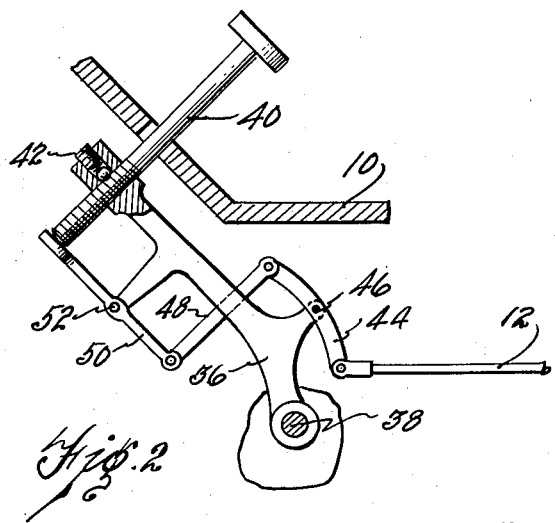
INVENTOR
Roy S. Sanford
BY
Burton & McConkey
ATTORNEYS Patented Apr. 14, 1931

1,800,473

UNITED STATES PATENT OFFICE

ROY S. SANFORD, OF SOUTH BEND, INDIANA, ASSIGNOR TO BENDIX BRAKE COMPANY, OF CHICAGO, ILLINOIS, A CORPORATION OF ILLINOIS

BRAKE-OPERATING MECHANISM

Application filed February 28, 1927. Serial No. 171,505.

My invention relates to improvements in brake operating mechanism. It is here shown as embodied in brake operating mechanism of the type generally employed on a road vehicle.

An object is to provide improved means conveniently disposed for operation whereby the brake operating mechanism may be readily adjusted as desired. Brake operating mechanism of the type wherein my invention is suitable for employment commonly comprises an adjustable brake connection disposed below the floor of a vehicle and including a lever extending upwardly through the floor and operable thereabove.

My improvement consists in the provision of means likewise operable above the floor of the vehicle and engaged below such floor with the adjustable brake operating connection to vary the adjustment thereof as hereinafter will more fully appear. More particularly, an object resides in the provision of means extending lengthwise through the brake operating lever and operable from the free end thereof adapted to vary the adjustment of the brake operating connection.

Other advantages and meritorious features of my invention will more fully appear from the following specification, appended claims, and accompanying drawing wherein:

Fig. 1 is a fragmentary sectional view through one embodiment of my invention.

Fig. 2 is a fragmentary elevation partly in section through a second embodiment of my invention.

Fig. 3 is a fragmentary sectional view partly in elevation through a third embodiment of my invention.

I have illustrated my invention as hereinabove stated in conjunction with brake operating structure commonly used on power driven road vehicles. In this art the brake operating mechanism is disposed below the floor of the vehicle and provided with operating levers or pedals extending upwardly through such floor for the convenient operation of the driver.

In the several figures of the drawing the floor of the vehicle is indicated as 10 and a suitable connection leading to the brake is indicated as 12. In Fig. 1 the brake connection 12 is adapted to be actuated by a hand lever 14 fulcrumed at 16 and provided with a bell crank 18 pivotally attached to the lower end thereof at 20. The brake connection 12 is attached to one end of the bell crank and a link 22 is attached to the opposite end. This link extends through a passageway 24 in the lever and is provided at the free end of the lever with an adjusting nut 26 whereby the angular relationship of the bell crank 18 with respect to the lever 14 may be varied to adjust the brake connection 12. The lever shown is of the usual type provided with a handle 28, carrying a spring controlled grip 30 which actuates a link 32 to control a dog 34 to releasably position the lever.

In Fig. 2 I have shown my invention as embodied in connection with pedal operating brake mechanism. The pedal assembly comprises a lever 36 mounted upon a fixed fulcrum 38 and provided with a tread portion 40. This tread portion is adjustably threaded through one end of the lever and an automatic locking device of common form is shown at 42. The brake connection 12 is pivotally articulated with the lever 44, fulcrumed at 46 upon the lever 36 and provided with a link 48 which extends to a link 50 that is fulcrumed at 52, which link 50 engages the end of the tread portion 40 to be actuated thereby upon adjustment of said tread portion whereby, as will be readily understood, the adjustment of the brake mechanism is accomplished through rotatable adjustment of the tread member 40 within the lever 36.

In Fig. 3 I have shown a third embodiment of my invention wherein the brake connection 12 is adapted to be applied through a pedal 54 fulcrumed at 56. I provide a pair of spaced apart sheaves 58 each of which is carried by a bracket 60 over which sheaves the cable 12 extends. Positioned between the sheaves 58 is a sheave 62 carried by a movable support 64. This support is here shown as extending upwardly through an opening 66 in the floor of the vehicle and as having a threaded end portion 68 upon which is mounted an adjustment nut 70 through which the sheave 64 may be raised to vary the tension on the cable 12.

It will appear that in each of the structures shown the adjustment of the brake operating mechanism may be accomplished by the operator from the interior of the vehicle and as readily as it is possible to accomplish the actuation of the brake operating mechanism yourself. The devices employed to adjust the brake operating mechanism are located in such proximity with the devices employed to actuate the brake operating mechanism that the operator may operate either or both from the same position.

What I claim is:

1. In brake operating mechanism, a brake operating lever pivoted intermediate its ends, a bell crank lever adjustably pivoted to one end of the brake operating lever, a brake operating connection pivoted to one end of the bell crank lever, and means connected with the opposite end of the bell crank lever and extending lengthwise the brake operating lever to vary the angular adjustment of the bell crank lever with respect to the brake operating lever.

2. In brake operating mechanism, an operating lever pivoted intermediate its ends and having its work arm arranged angularly with respect to its power arm, a part adjustably pivoted to the work arm, a brake operating connection secured to said part for actuation by the lever and means extending lengthwise the power arm of the lever to vary the pivotal adjustment of said part.

3. In brake operating mechanism, an operating lever pivoted intermediate its ends and having its work arm arranged angularly with respect to its power arm, a part adjustably pivoted to the work arm, a brake operating connection secured to said part for actuation by the lever and means extending lengthwise through the power arm of the lever and operable from the free end thereof to vary the pivotal adjustment of said part.

4. In brake operating mechanism, an operating lever pivoted intermediate its ends and having its work arm disposed angularly with respect to its power arm, a brake operating connection adjustably coupled with the work arm to be actuated by the swinging pivotal movement of the lever, and means extending lengthwise the power arm of the lever to vary said adjustment.

5. In brake operating mechanism, an operating lever pivoted intermediate its ends and having its work arm disposed angularly with respect to its power arm, a brake operating connection adjustably coupled with the work arm to be actuated by the swinging pivotal movement of the lever, and means extending lengthwise through the power arm of the lever operable from the free end thereof to vary said adjustment.

In testimony whereof I, Roy S. Sanford, sign this specification.

ROY S. SANFORD.